United States Patent
Ohara et al.

[11] Patent Number: 6,047,366
[45] Date of Patent: Apr. 4, 2000

[54] SINGLE-INSTRUCTION MULTIPLE-DATA PROCESSOR WITH INPUT AND OUTPUT REGISTERS HAVING A SEQUENTIAL LOCATION SKIP FUNCTION

[75] Inventors: Kazuhiro Ohara, Richardson, Tex.; Hiroshi Miyaguchi, Tokyo; Yuji Yaguchi, Niihari-Gun, both of Japan

[73] Assignee: Texas Instruments Incorporated, Dallas, Tex.

[21] Appl. No.: 08/993,803

[22] Filed: Dec. 18, 1997

Related U.S. Application Data

[60] Provisional application No. 60/034,126, Dec. 31, 1996.

[51] Int. Cl.[7] .................................................. G06F 15/76
[52] U.S. Cl. .............................. 712/14; 712/20; 712/22; 711/217; 711/218
[58] Field of Search ........................ 395/800.22, 800.14, 395/800.11, 800.13, 800.2; 712/10, 14, 20, 21, 22, 27; 711/217, 218

[56] References Cited

U.S. PATENT DOCUMENTS

| | | | |
|---|---|---|---|
| 5,253,308 | 10/1993 | Johnson | 395/800.22 |
| 5,321,510 | 6/1994 | Childers et al. | 395/800.22 |
| 5,555,428 | 9/1996 | Radigan et al. | 395/800.22 |
| 5,752,068 | 5/1998 | Gilbert | 395/800.16 |
| 5,765,015 | 6/1998 | Wilkinson et al. | 395/800.22 |

*Primary Examiner*—John A. Follansbee
*Assistant Examiner*—Dzung Nguyen
*Attorney, Agent, or Firm*—Charles A. Brill; Wade James Brady, III; Frederick J. Telecky, Jr.

[57] ABSTRACT

A single-instruction multiple-data (SIMD) processor (10) that incorporates features for horizontal scaling of video data. The processor (10) has a data input register (11) that is operable to store input data word in sequential locations in the data input register (11) and transfer the input data words to an array of processing elements. The processor (10) also has an output data register (16) operable to receive data output words from the array of processing elements and to output said data output words from sequential locations of said output data array. An input skip signal input to the processor causes a sequential data write operation to skip a location of the input data register while an output skip signal to the processor causes a sequential data read operation to skip a location of the output data register.

16 Claims, 3 Drawing Sheets

SINGLE-INSTRUCTION MULTIPLE-DATA PROCESSOR WITH INPUT AND OUTPUT REGISTERS HAVING A SEQUENTIAL LOCATION SKIP FUNCTION

This application claims priority from provisional application Ser. No. 60/034,126 filed Dec. 31, 1996.

TECHNICAL FIELD OF THE INVENTION

This invention generally relates to single-instruction multiple-data processors, and more particularly to controlling the distribution of input data to processing elements or of the distribution of output data from processing elements so as to achieve horizontal scaling of video input signals.

BACKGROUND OF THE INVENTION

Single-instruction multiple-data (SIMD) processors are characterized by having an array of processing elements that perform the same operation simultaneously on every element of a stream of data values. A type of SIMD processor is an SVP processor, characterized by a linear array of processing elements and a "layered" structure, in which an input register receives data word-serially, processing elements perform computations on the data, and an output register outputs the processed data word-serially.

One application of SVP processors is for video data processing, such as in digital televisions or other display devices. Each stream of data values represents a line of pixels of an image. The line are processed line-by-line. Each processing element processes a different pixel value.

The data delivered to an SVP-based display device does not always have the same horizontal or vertical resolution as that of the display size of the image to be displayed. When this is the case, the SVP processor is used to scale the data.

Horizontal scaling may either increase or decrease the horizontal resolution of the input data, by expanding or decimating each line of input data, respectively. When the SVP processor expands the data, it uses the input pixel values to generate new pixel values. When it decimates the data, it removes pixel values and usually first combines the removed values with neighboring pixel values.

When lines of input data are to expanded, each line has more pixel values output from the SVP than are input. Somehow, space must be provided within the SVP for the new pixel values. This has been accomplished by using external memory at the input of the SIMD or by data shift instructions.

Similarly, when lines of input data are to be decimated, each line has more pixel values input to the SVP than are output. The resulting gaps at the data output must be eliminated. This has been accomplished by using external memory at the output of the SIMD or by data shift instructions.

SUMMARY OF THE INVENTION

One aspect of the invention is a single-instruction multiple-data (SIMD) processor capable of "input skip" for horizontal expansion. The SIMD processor has an input layer, a computational layer, and an output layer. These layers are implemented with an input register, processing elements, and an output layer, respectively. The input register receives incoming data values, one line at a time. The processing elements each have an input memory that receives data transferred from the input register, an ALU that receives data from the input memory and performs an expansion algorithm on the data, and an output memory that receives processed data from the ALU. The output register receives processed data transferred from the processing elements and outputs data values, one line at a time, with the output line being an expanded version of the input line. The input register has a control input that permits processing elements to be skipped during input. As a result of the input skip, for an m:n expansion, every n processing elements can generate new data values.

Another embodiment of the invention is an SIMD that is capable of "output skip" for horizontal decimation. In this case, the output register has a control input that permits processing elements to be skipped during output.

A technical advantage of the invention is that it permits horizontal scaling to be performed without requiring external memory or additional data shift instructions. This avoids the extra cost that would be incurred if additional memory were required, or the reduced data throughput that would result if additional instructions were required.

DETAILED DESCRIPTION OF THE INVENTION

Figure 1:
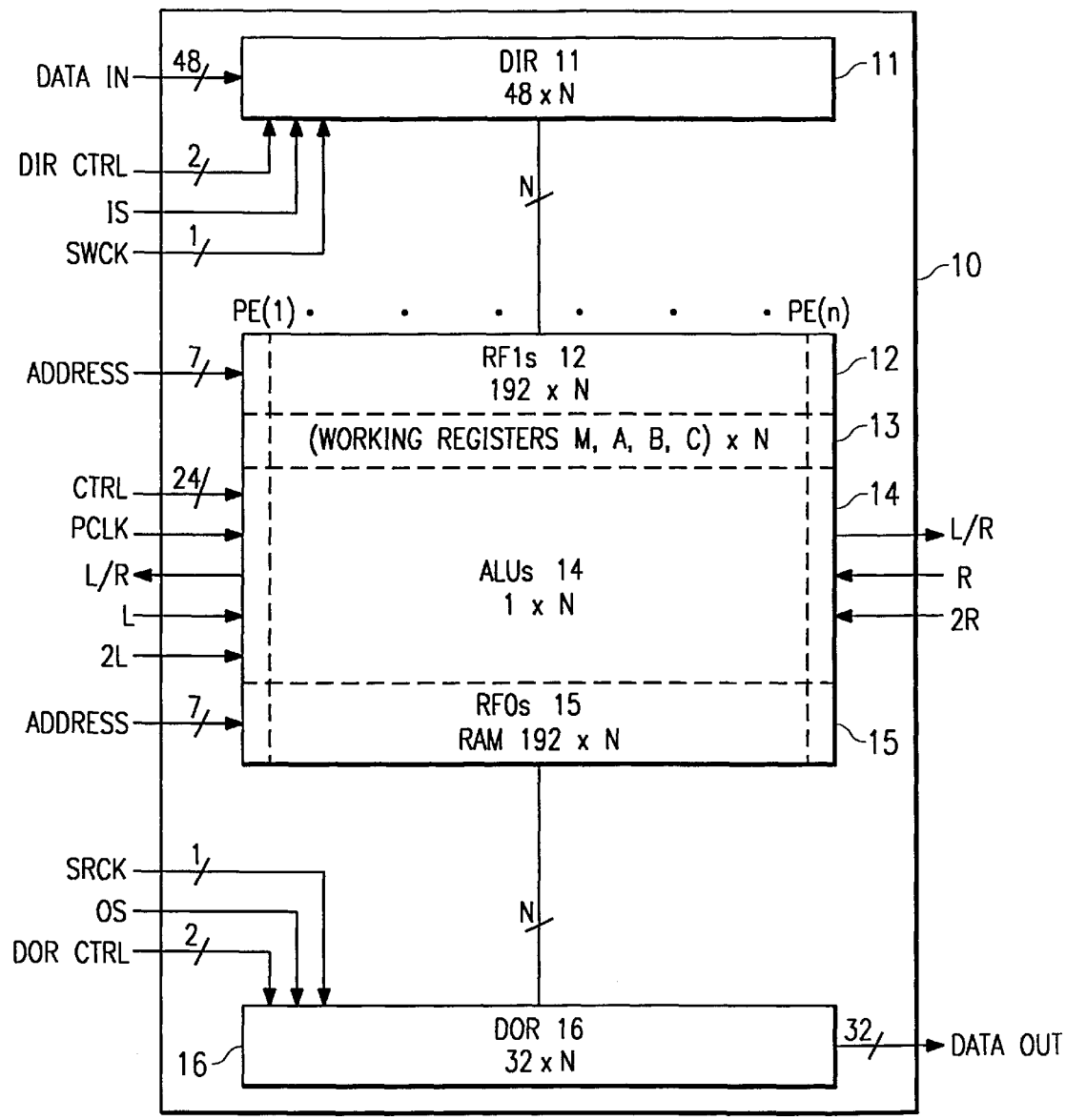
FIG. 1 is a block diagram of a representative single-instruction multiple-data (SIMD) processor.
Figure 2:
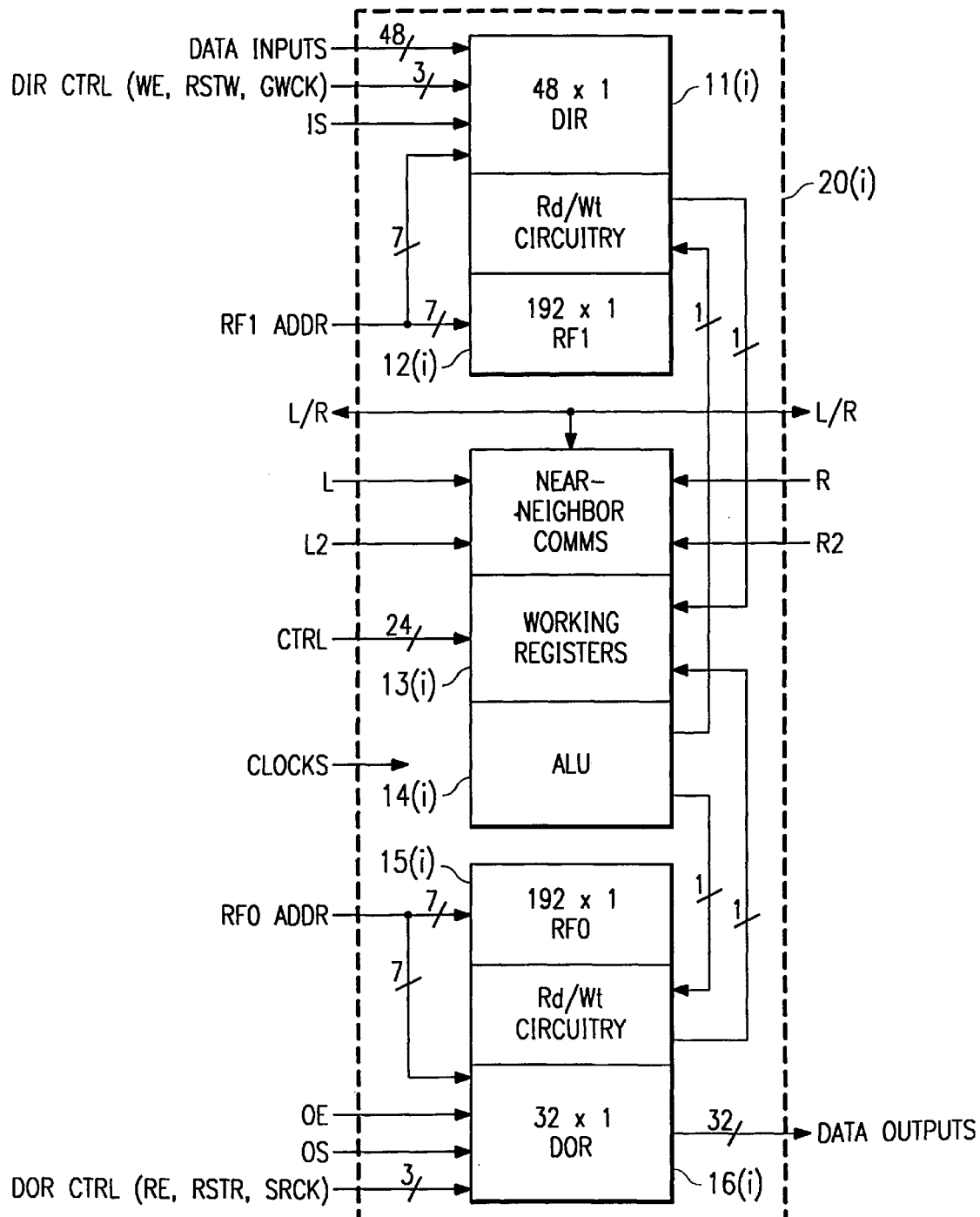
FIG. 2 is a block diagram of a processing element of the SIMD processor of FIG. 1 and its relationship to the input and output registers.

FIG. 1 illustrates an example of a scan line video processor (SVP) 10, also sometimes known as a serial video processor or a synchronous vector processor (also SVP), in accordance with the invention. FIG. 2 illustrates a single PE 20(i) of SVP 10, where i=1 . . . 1024, and its associated portions of the data input register (DIR) 11 and data output register (DOR) 16. SVP 10 is a one-dimensional array of one-bit serial PE's 20. A vertical slice through SVP 10 of FIG. 1 yields an individual PE 20 of FIG. 2.

The "serial video" aspects of SVP 10 derive from the fact that it is particularly suited for video processing, where discrete packets of incoming data, which have a uniform size, are input and output in a word-serial manner but are processed by the PE's 20 in parallel. Depending on the horizontal resolution of the video images, the packet of data may be all or part of a line of an image. In the latter case, multiple SVPs 10 can be connected to process a line of data that is longer than the input capacity of a single SVP, and the packet of data would be a portion of the line.

The "synchronous vector" aspects of SVP 10 derive from the fact that it receives and processes data vectors in synchronization with a real-time data source. Essentially, SVP 10 operates by using fine-grained concurrently.

FIGS. 1 and 2 illustrate one example of an SVP. Another example of an SVP, without the features of the present invention, is described in U.S. Pat. No. 5,321,510, entitled "Serial Video Processor", assigned to Texas Instruments Incorporated and incorporated herein by reference. Various other SVP's are the TMC57110, TMS57114, and TMS57115 SVP's manufactured by Texas Instruments Incorporated.

The present invention is directed to an improvement of an SVP, such as SVP 10, with the improvement enhancing the ability of SVP 10 to perform horizontal scaling of a line of data values. The improvement is not necessarily limited to use with the particular SVP 10 of FIG. 1, and variations of SVP 10 may be used. As stated above, SVPs may be used individually or connected together, depending on the image size. Thus, the lines of data values processed by the SVP, may be all or part of the line to be displayed.

SVP 10 is a general purpose single-instruction multiple-data (SIMD), reduced instruction set computing (RISC) device. Consistent with the SIMD characteristic, the PEs 20 execute the same instruction at the same time. Externally generated microinstructions control primitive logic and arithmetic functions during each clock cycle. An SVP device may include an instruction generator (not shown) in the same device, and the instruction generator may also have a program memory implemented with RAM or mask ROM.

The basic components of SVP 10 are described briefly herein. Reference to the above-referenced patent will provide further description, especially with regard to instructions and timing.

Referring to FIGS. 1 and 2, the SVP 10 has a three-layer structure: a data input register (DIR) 11, PEs 20, and a data output register (DOR) 16. DIR 11 can be thought of as the "input layer". The PE's 20 are the "computational layer". DOR 16 is the "output layer". The input to DIR 11 is word-serial in the sense that words of an incoming line of data are received into DIR 11 word-by-word. Similarly, the output from DOR 16 is word-serial. In effect, each word of DIR 11 and DOR 16 has a corresponding PE 20.

Although input and output are word-serial, the PE's 20 perform their processing on each line of data values in parallel. Also, because of the "layered" approach to processing, data input, computation, and data output may be concurrent operations, with each being independently clocked. Each PE 20 is a "pipeline" that enables different data values to undergo operations in various stages at once. Input and output may be in synchronization with the data source, such as a video data buffer, and with the data sink, such as display equipment, respectively.

For purposes of illustration, SVP 10 has N number of PE's 20, where N=1024. DIR 11 is 48 bits wide and DOR 16 is 32 bits wide. These sizes are discretionary, and may be changed without changing the substance of the invention. The input and output bit sizes are included in FIGS. 1 and 2 to illustrate various input/output and device size relationships. DIR 11 and DOR 16 are the basic I/O devices of SVP 10. Both DIR 11 and DOR 16 are arrays of sequentially addressed, dual-ported memory cells.

Referring to both FIGS. 1 and 2, the maximum data input capacity to SVP 10 permitted by DIR 11 is 1024 words×48 bits. One port of DIR 11 is organized as 1024 words of 48 bits each and permits DIR 11 to be written into from a 48-bit input line in parallel. This first port of DIR 11 emulates the write port of a 1024-word line memory, which permits word-serial input. The second port of DIR 11 is organized as 48 words of 1024 bits each, where each bit corresponds to a PE 20. This second port is physically a part of, and is mapped into, address space of the PEs 20. This permits the contents of DIR 11 to be addressed for selection to write into the PEs 20.

Like DIR 11, DOR 16 is a two-port device. In a manner similar to DIR 11, it provides 1-bit access to each PE 20 and 32-bit output from SVP 10. One port of DOR 16 is organized as 1024 words of 32 bits each. This port functionally emulates the read port of a 1024-word line memory and is used for word-serial output. The second port of DOR 16 is organized as 32 words of 1024 bits each, where each bit corresponds to a PE 20. This second port is mapped to address space of the PEs 20.

Each PE 20 has two register files (RF1 and RF0) 12 and 15, a set of working registers (WR's) 13, a one-bit arithmetic logic unit (ALU) 14. The register files RF1 12 and RF0 15 provide the address space for the PEs 20. Each RF1 12 is written with data from the DIR 11. After processing, each RF0 15 is read and the data written to DOR 16. Within each PE 20, its RF1 12 and RF0 15 are independently addressable and capable of 1-bit read-modify-write cycle such that it can be read, the data operated on by ALU 14, and the result written back to it in a single clock cycle.

RF1 12 and RF0 15 each have 192-bits of read/write memory per PE 20, and have different addressing structures. RF1 12 and RF0 15 are comprised of random access memory (RAM) cells. If dynamic RAM cells are used, they must be refreshed, but typical digital video applications perform the refresh by operating in a faster cycle time than the required refresh period. RF1 12 and RF0 15 read and write data at the same time.

The working register (WR) set 13 for each PE 20 is comprised of four registers: M, A, B, and C. These registers are the same, except for their data sources and destinations. Each WR 13 is associated with an input multiplexer, and provides data to the four inputs of its associated ALU 14. The M register is used for division, multiplication, and logical and conditional operations. Registers A, B and C are addend, minuend, and carry/borrow registers, respectively.

ALU 14 is a simple full adder/subtracter and a onebit multiplier. The inputs to ALU 14 are from the WR's 13. The ALUs 14 carry out whatever instruction is specified by the instruction generator (not shown) in communication with SVP 10.

Data transfers from input pins to DIR 11 are controlled by four input control signals: Write Enable (WE), Reset Write (RSTW), Input Skip (IS), and Serial Write Clock (SWCK). WE controls both the write function and a write pointer increment function synchronously with SWCK. This write pointer provides an address for the appropriate DIR 11. After RSTW goes high, the first positive transition of SWCK resets the write address pointer to the first word of DIR 11. The Input Skip (IS) signal permits selected PEs 20 to be skipped on input and is used for horizonal expansion. The operation of the IS signal is explained below in connection with FIGS. 3A and 3B.

The output control signals for DOR 16 are Read Enable (RE), Reset Read (RSTR), Output Skip (OS), and Serial Read Clock (SRCK). After RSTR goes high, the first positive transition of SRCK resets the read address pointer to the first word of DOR 16. An optional output enable (OE) may also be provided. The Output Skip (OS) signal permits selected PEs 20 to be skipped on output and is used for horizontal decimation. The operation of the OS signal is explained below in connection with FIGS. 4A and 4B. Otherwise, the output control signals control data transfers from the DOR 16 of each PE 20 in a manner analogous to the DIR control signals, by incrementing a read pointer for an address to DOR 16.

A feature of SVP 10 is the capability to provide near neighbor communications among PE's 20. A left/right (L/R) bus provides direct memory and register read/write from each PE 20 to its eight nearest neighbor PE's 20, i.e., the four PE's 20 to the left and the four PE's 20 to the right. To accomplish such communication, each PE 20 generates one output, which is fanned out to its eight neighbor PE's 20.

This output may be from any one of four sources: a logical 0, the contents of the B register of WR 13, or allocation from either RF0 12 or RF1 15. Each PE 20 receives eight signals, one from each of its eight nearest neighbors. The near neighbor communications are useful for implementing horizontal scaling algorithms.

For video processing, pixel values on a horizontal scan line (one line of the input image) are delivered word-serially into DIR 12, then transferred to the PEs 20 during the horizontal blanking period. The pixel values are processed while the next horizontal scan line is delivered. The processed pixel values are transferred to DOR 16 and shifted word-serially from SVP 10. Each PE 20 processes a pixel value and all pixels are processed in parallel. The processing is repeated line-by-line for each image frame.

Figure 3A:
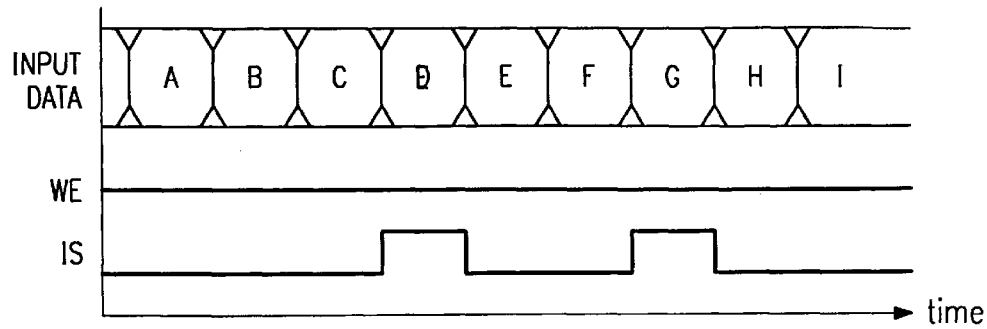
FIGS. 3A and 3B illustrate how the input skip signal of FIGS. 1 and 2 is used for horizontal expansion.
Figure 3B:
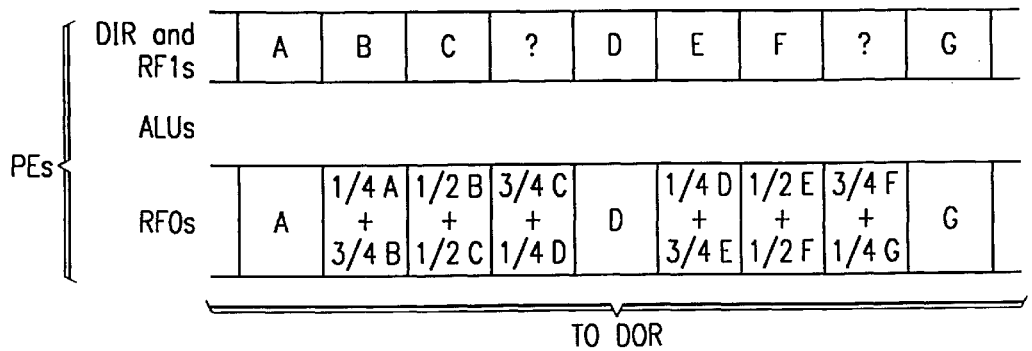

FIGS. 3A and 3B illustrate the use of SVP 10 for horizonal expansion. A portion of a line of pixel values is designated as A, B, C, . . . I. In the example of this description, the line of pixel values is to be expanded with a 3:4 scaling factor. Various other scaling ratios and algorithms can be used, with just one example shown in FIGS. 3A and 3B.

The pixel values are received into the DIR 11. Each pixel value is to be processed by a different PE 20. As described above, a write enable (WE) is high for writing to the corresponding DIR 11 of each PE 20. The IS signal is switched at appropriate times to cause one PE 20 to be skipped. In the example of FIG. 3A, if IS is high, the DIR location to be written is skipped by one PE 20. The input skip may be accomplished by bypassing the DIR write pointer by one PE 20.

For 3:4 expansion, because of the "input skip", every fourth DIR 11 does not receive an input pixel value. During the horizontal blanking period, the DIR data is transferred to the RF1s 12 and the scaling calculations are performed. The ALUs 14 of the skipped PEs 20 generate "new" pixel values as compared to the "recalculated" pixel values generated by other PEs 20. After the ALU's 14 generate the expanded line of pixel values, comprised of new and recalculated pixel values, the RF0's 15 receive these pixel values. The pixel values are transferred from the RF0's 15 to the DOR 16 for output from the SVP 10. Thus, on the output side, the number of pixel values corresponds to the desired length of the line.

Figure 4A:
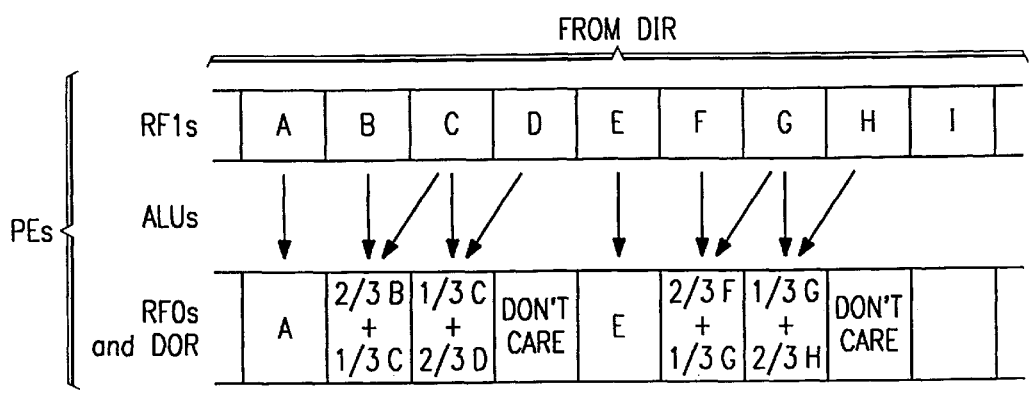
FIGS. 4A and 4B illustrate how the output skip signal of FIGS. 1 and 2 is used for horizontal decimation.
Figure 4B:
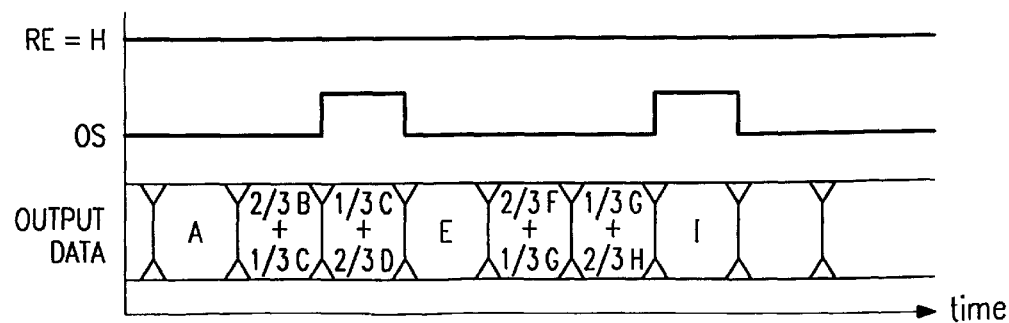

FIGS. 4A and 4B illustrate the use of SVP 10 for horizonal decimation. In the example of FIGS. 4A and 4B, a line of pixel values is to be decimated with a 4:3 scaling factor. As in the case of horizontal expansion, other scaling ratios and algorithms can be used, with just one example shown in FIGS. 4A and 4B.

The pixel values are received into the DIR 11. Each pixel value is delivered to a different PE 20 for processing, via the RF1s 12. The ALU's 14 perform the decimation algorithm, with every fourth value being a "don't care" value. The processed data is delivered to the RF0's 15. For transferring data from the RF0's 15 to the DOR 16, a read enable (RE) signal is high. However, in order for a particular DOR 16 to be read, the output skip (OS) signal must be low. The OS signal is switched at appropriate times to cause selected PEs 20 to be skipped. The input skip may be accomplished by bypassing the DOR read pointer by one PE 20. The result is that a number of pixel values corresponding to the desired decimated line length is output from DOR 16.

The above examples of input skip and output skip are directed to skipping a single PE 20 at a time. The same concepts could be used to skip groups of more than one PE 20 at a time.

Also, although the above description is in terms of expanding or decimating pixel values for video applications, the same concepts could be applied to expanding or decimating any type of data values.

Other Embodiments

Although the invention has been described with reference to specific embodiments, this description is not meant to be construed in a limiting sense. Various modification of the disclosed embodiments, as well as alternative embodiments of the invention will be apparent to persons skilled in the art. It is, therefore, contemplated that the appended claims will cover all modifications that fall within the true scope of the invention.

What is claimed is:

1. A single-instruction multiple-data processor having processing elements operable to process incoming data values in parallel, comprising:

a data input register operable to receive said incoming data values into sequential locations in said data input register;

a plurality of said processing elements; each having an input memory that receives data transferred from said input register, an ALU that receives data from said input memory and performs computations on said data, and an output memory that receives processed data from said ALU; and a data output register operable to receive said processed data transferred from said processing elements;

wherein said processor has at least one control input that permits selected sequential locations in said data input register to be skipped while said data is being input to said data input register.

2. The processor of claim 1, wherein said input memory is an input register file and said output memory is an output register file.

3. The processor of claim 1, wherein said data input register is addressed with an address pointer, and wherein said control input causes said address pointer to skip selected said sequential locations in said data input register.

4. A single-instruction multiple-data processor having processing elements operable to process incoming data values in parallel, comprising:

a data input register operable to receive said incoming data values;

a plurality of said processing elements; each having an input memory that receives data transferred from said input register, an ALU that receives data from said input memory and performs computations on said data, and an output memory that receives processed data from said ALU; and a data output register operable to receive said processed data transferred from said processing elements and to output said processed data from sequential locations of said data output register;

wherein said processor has at least one control input that permits selected said sequential locations of said data output register to be skipped while said data is being output from said data output register.

5. The processor of claim 4, wherein said input memory is an input register file and said output memory is an output register file.

6. The processor of claim 4, wherein said data output memory is addressed with an address pointer, and wherein said at least one control input causes said address pointer to skip selected said sequential locations of said data output register.

7. A method of using a single-instruction multiple-data processor having processing elements to perform horizontal expansion of incoming data values, said method comprising the steps of:

receiving a stream of incoming data values;

receiving an input skip signal;

storing sequential data values in said stream of incoming data values into sequential locations in a data input register when said location skip signal is inactive and skipping a location in said data input register when said location skip signal is active;

transferring said data values into said processing elements, each of said processing elements having an input memory that receives data values transferred from said input register, an ALU that receives data from said input memory and performs computations on said data, and an output memory that receives processed data from said ALU;

processing said data values;

transferring said data values out from said processing elements to a data output register; and delivering said data values from said data output register.

8. The method of claim 7, wherein said data values are pixel values of a video signal.

9. The method of claim 7, wherein said step of receiving said incoming data values is performed by bypassing said selected ones of said processing elements in response to said input skip signal.

10. The method of claim 7, wherein said step of receiving said incoming data values is performed by using a write enable signal and said input skip signal having a logic state that causes said locations of said input data register to be bypassed.

11. The method of claim 7, wherein said step of receiving said incoming data values is performed by incrementing a pointer to an address in said data input register and wherein said pointer is used to cause said locations of said input data register to be bypassed.

12. A method of using a single-instruction multiple-data processor having processing elements to perform horizontal decimation of incoming data values, said method comprising the steps of:

receiving said incoming data values into a data input register;

receiving an output skip signal;

transferring said data values to a plurality of processing elements, each processing element having an input memory that receives data values transferred from said input register, an ALU that receives data from said input memory and performs computations on said data, and an output memory that receives processed data from said ALU;

processing said data values with said processing elements;

transferring said data values out from said processing elements to a data output register; and delivering said data values from said data output register such that data values from sequential locations of said data output register are output sequentially when said output skip signal is inactive and locations of said data output register are skipped when said output skip signal is active.

13. The method of claim 12, wherein said data values are pixel values of a video signal.

14. The method of claim 12, wherein said step of delivering said data values is performed by bypassing said selected ones of said processing elements in response to said output skip signal.

15. The method of claim 12, wherein said step of delivering said data values is performed by using a read enable signal and said output skip signal having a logic state that causes said locations of said data output register to be bypassed.

16. The method of claim 12, wherein said step of delivering said data values out is performed by incrementing a pointer to an address in said data output register and wherein said pointer is used to cause said locations of said data output register to be bypassed.

* * * * *